United States Patent

[11] 3,627,104

[72] Inventors Vasily Romanovich Verchenko
Leningradsky prospekt, 69, kv. 128;
Valery Alexandrovich Ilichov, A-482
Korpus 342, kv. 133; Vladimir
Konstantinovich Andrinanis, Bulvar Yana
Raimisa, 18, Korpus 2, kv. 17; Vladimir
Ivanovich Gorjunov, Belyaevo; Mikhail
Grigorievich Gavrin, Leninsky prospekt,
85, kv. 429, all of Moscow, U.S.S.R.
[21] Appl. No. 875,117
[22] Filed Nov. 10, 1969
[45] Patented Dec. 14, 1971

[54] DEVICE FOR SPATIAL ORIENTATION OF FLAT
ARTICLES AND MEMBERS
4 Claims, 2 Drawing Figs.
[52] U.S. Cl. .................................................. 198/33 AA,
221/159
[51] Int. Cl. .................................................. B65g 47/24
[50] Field of Search .......................................... 221/159,
157; 209/116, 108

[56] References Cited
UNITED STATES PATENTS
| 2,702,064 | 2/1955 | Lange ...................... | 198/33 AA |
| 2,725,971 | 12/1955 | Clark-Riede ............ | 221/159 |
| 3,297,133 | 1/1967 | Sterling ................... | 198/33 |

Primary Examiner—Richard E. Aegerter
Attorney—Waters, Roditi, Schwartz & Nissen

ABSTRACT: A device for the spatial orientation of flat members and other such articles which makes it possible to use the difference in the coefficients of friction of the surfaces of the articles to set the latter in positions in which the surface having a lower friction coefficient is directed upwards due to the fact that a helical chute mounted inside the vibrobunker has a section inclined to the bottom therefor, the bottom being provided with an inwardly directed conical projection, a space being provided between said section of the chute and said projection for displacing the articles to the conical projection which is used for turning the articles over.

Patented Dec. 14, 1971  3,627,104

2. A device for the spatial orientation of articles each having opposite faces respectively having first or second coefficients of friction, said device comprising a vibrobunker, and a helical chute adapted for conveying said articles upwardly within said vibrobunker, said chute including a section inclined transversely of the chute and arranged such that all articles moving along the chute must traverse said section, said sections being inclined at an angle which permits said articles to slide therefrom selectively depending on which of the faces of the articles is directly downwardly.

3. A device as claimed in claim 2 comprising means associated with said section to receive articles sliding therefrom and to invert the same.

4. A device as claimed in claim 3 comprising means to adjust the angle at which said section inclines.

DEVICE FOR SPATIAL ORIENTATION OF FLAT ARTICLES AND MEMBERS

The present invention relates to devices for the spatial orientation of flat articles and members employed in various branches of mechanical engineering. The invention can be most effectively used in the building industry for making carpets of glazed ceramic plates.

Known in the prior art are devices for the spatial orientation of flat articles and other such members said devices being of the type comprising a vibrobunker with a helical chute fixed to the inner wall of the bunker. The chute is provided with elements for turning the articles to a required position. Supports and shaped sections of the chute serve as the above-mentioned elements (see the book "Typical Vibratory Bunkers and Orientating Devices for Automatic Machines used in Instrumentation Industry," Moscow, 1958, page 20).

The above-said devices provide for orientation of the articles in the process of their movement along the helical chute by turning these articles in the chute plane. In this case the orientation is carried into effect depending on the shape of the articles.

An object of the invention is to provide an improved device for the spatial orientation of flat articles and other such members, the construction of the device being such that it makes it possible to orientate an article in space by using the difference in the working of their surfaces and to set the article to such a position that the surface featuring a lower friction coefficient is directed upwards.

This object is accomplished by providing a device for the spatial orientation of flat articles and other such members comprising a vibrobunker friction a helical chute fixed to the inner wall of the bunker and provided with an element for changing the position of the articles wherein, according to the invention, the helical chute has a section inclined to the bunker bottom, the latter having a conical projection directed into the bunker and serving for changing the position of the articles in space, in which case between the aforesaid section of the chute and the conical projection there is provided a space for transferring the articles to the conical projection used for turning these articles over. The section of the chute inclined to the bunker bottom is preferably a plate coupled to the bunker wall with the possibility of changing its angle of inclination relative to the bunker bottom.

The angle of inclination of the section of the helical chute is selected so as to be higher than the angle of friction of the surface of the article which is characterized by a lower friction coefficient (i.e., the smooth surface) and to be less than the angle of friction of the surface of the article which is characterized by a higher friction coefficient (i.e., the rough surface). In this case, during the vibration of the bunker the aforementioned section should not impede the upward movement of an article along the chute when the smooth surface of the article (i.e., the surface having a lower friction coefficient) is directed upwards.

If the smooth surface of the article is directed downwards, to the section inclined to the bottom, this article slides along the inclined section and falls. On falling the article meets the conical projection which turns the article over, thus causing it to fall on the bunker bottom by the back face, i.e., the smooth surface of the article is directed upwards.

Due to the possibility of changing the angle of inclination of the said chute section relative to the bunker bottom, the proposed device can be used for spatial orientation of flat articles the surfaces of which are characterized by different friction coefficients. In this case each surface may have a different friction.

To provide a better understanding of the advantages of the present invention a description of a preferred embodiment of the invention in the form of a device for the orientation of ceramic plates having a single glazed face is given hereinafter and is illustrated in the accompanying drawings, in which.

Figure 1:
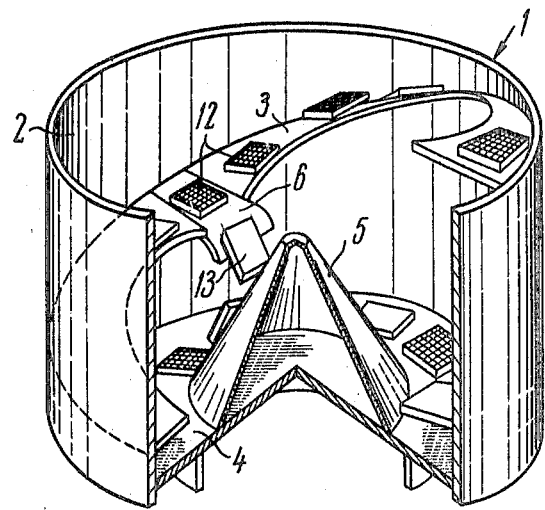
FIG. 1 shows a general view of the device according to the invention.

FIG. 1 shows a device having a vibrobunker 1 (the vibrator is not shown in the drawing) within which on a sidewall 2 is secured a helical chute 3, while a bottom 4 is provided with a conical projection 5 inside the bunker 1.

The helical chute 3 has a section 6 inclined to the bottom 4 of the bunker 1 and inwardly from sidewall 2, while a space is provided between the section 6 and the projection 5.

Figure 2:
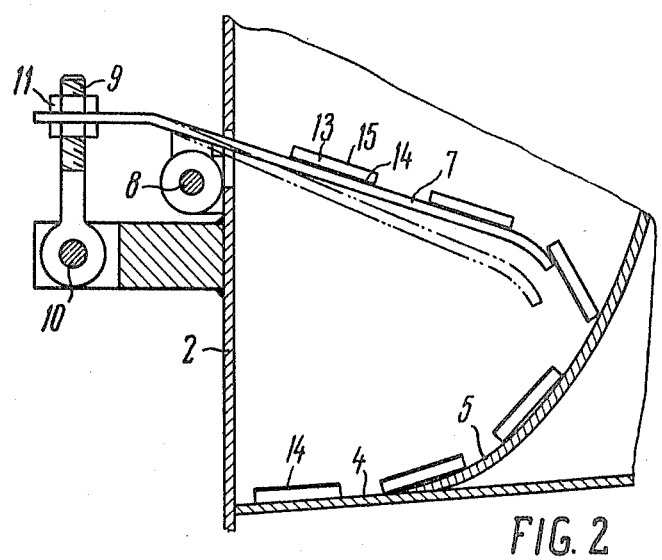
FIG. 2 is a sectional elevational view showing a portion of the bunker with an inclined section and the unit for securing this section of the chute to the wall of the bunker.

The chute section inclined to the bottom can be made in the form of a plate 7 (FIG. 2) which is preferably secured to the wall 2 of the bunker by means of a cylindrical hinge joint 8 and a screw 9 one end of which is fixed by a cylindrical joint 10 to the wall 2 and the other end of which is secured by nuts 11 to said plate 7.

The operation of the proposed device is next considerable relative to an example of the orientation of ceramic plates with a single glazed face glued to a base in the process of making platelike carpets employed for lining various surfaces.

The ceramic plates 12 and 13 having a single glazed face are charged into the vibrobunker (FIG. 1) in which the angle of inclination of the section 6 of the helical chute 3 is greater than the angle of friction of that face 14 (FIG. 2) of the plate which is characterized by a lower friction coefficient. During vibration of the bunker the plates start to displace upwards along the helical chute 3.

The plates 12 disposed on the chute 3 with the downwardly directed face characterized by a higher friction coefficient than that of the upwardly directed face will not be retained on the section 6 of the chute 3 and will displace along the chute 3 up to the outlet from the bunker.

The plates 13 disposed on the chute 3 with the face 14 directed downwards and characterized by a lower friction coefficient than that of the upper surface 15, owing to the fact that the angle of inclination of this section in the chute exceeds the angle of friction of the face 14, slide along the inclined section 6 of the chute 3 and fall into the space between this section of the chute and the conical projection of the bottom. When meeting the conical projection 5, the plates 13 overturn and lay on the bottom 4 with the face 14 directed upwards, i.e., occupy the position necessary for passing the section 6 and further displacement upwards along the chute 3.

For orientation of the plates whose faces are characterized by other friction coefficients it is possible to change the angle of inclination of the section 6 of the chute 3, i.e., the angle of inclination of the plate 7.

For this purpose it is necessary by means of the nuts 11 to loose the connection of the plate with the screw 9 and to set a required angle of inclination of this plate relative to the bottom 4. Thereafter the plate is fixed again by the means of the nuts 11.

Thus, the proposed device provides for spatial orientation of articles and members based on the difference in the degree of working of their surface and makes it possible to arrange these articles in such a position in which the surface characterized by a lower friction coefficient is directed upwards.

We claim:

1. A device for the spatial orientation of flat articles and other such members, such device comprising in combination: a vibrobunker including a bottom and a sidewall extending upwardly from the bottom, a helical chute secured on said sidewall inside said vibrobunker and leading upwardly from said bottom, said chute including a section inclined away from the wall of said vibrobunker and toward the bottom of said vibrobunker, a conical projection extending upwardly from said bottom with the chute and adapted for changing the position of articles displaced along the chute and traversing said section, a space being provided between said section of the chute and said conical projection within which the articles are turned over by engagement with said projection, the section being a plate, and means for changing the angle of inclination of the plate relative to said bottom.